(12) United States Patent
Cavalli et al.

(10) Patent No.: US 9,702,790 B2
(45) Date of Patent: Jul. 11, 2017

(54) WHEEL SERVICE MACHINE WITH COMPACT SENSING DEVICE

(71) Applicant: Snap-on Equipment Srl A Unico Socio, Correggio (RE) (IT)

(72) Inventors: Gianluca Cavalli, Modena (IT); Francesco Braghiroli, Reggio Emilia (IT); Marco Tralli, Modena (IT)

(73) Assignee: SNAP-ON EQUIPMENT SRL A UNICO SOCIO, Correggio (IT)

( * ) Notice: Subject to any disclaimer, the term of this patent is extended or adjusted under 35 U.S.C. 154(b) by 55 days.

(21) Appl. No.: 14/808,615

(22) Filed: Jul. 24, 2015

(65) Prior Publication Data

US 2017/0023443 A1   Jan. 26, 2017

(51) Int. Cl.
   *G01M 17/02*   (2006.01)
   *B60C 25/05*   (2006.01)
   *G01B 11/00*   (2006.01)

(52) U.S. Cl.
   CPC ....... *G01M 17/027* (2013.01); *B60C 25/0554* (2013.04); *G01B 11/00* (2013.01); *G01M 17/021* (2013.01)

(58) Field of Classification Search
   None
   See application file for complete search history.

(56) References Cited

U.S. PATENT DOCUMENTS

| 6,244,108 B1* | 6/2001 | McInnes | G01M 1/02 73/462 |
| 9,114,676 B2* | 8/2015 | Sotgiu | B60C 25/132 |
| 2002/0018218 A1 | 2/2002 | Conheady et al. | |
| 2005/0132786 A1 | 6/2005 | Cullum et al. | |
| 2014/0311231 A1* | 10/2014 | Braghiroli | G01M 1/04 73/146 |
| 2017/0023442 A1* | 1/2017 | Braghiroli | G01M 17/021 |

FOREIGN PATENT DOCUMENTS

DE   10035118 A1   1/2002
EP   2360461 A1   8/2011

OTHER PUBLICATIONS

European Search Report EP Application No. 15178335.4 dated Jan. 22, 2016.

\* cited by examiner

*Primary Examiner* — Andre Allen
(74) *Attorney, Agent, or Firm* — McDermott Will & Emery LLP

(57) ABSTRACT

A wheel service machine and a method for servicing a wheel, such as a tire changer or a wheel balancer for a vehicle wheel, comprises a rotary mounting including a shaft to which the wheel is mounted, a frame work for carrying at least the rotary mounting, and a sensing device mounted to the frame work, for determining geometrical dimensions of the wheel, or parts of the wheel. The sensing device comprises a carrier element and a first sensing unit for sensing the wheel and a computing device for determining the geometrical dimensions of the wheel based on the data received from the sensing device, the first sensing unit being mounted on the carrier element. The wheel service machine further comprises a drive element for enabling a pivotal movement of the sensing device, wherein the drive element is a micro stepper motor.

15 Claims, 5 Drawing Sheets

WHEEL SERVICE MACHINE WITH COMPACT SENSING DEVICE

BACKGROUND

The present invention relates to a sensing device for sensing the geometry of an object, like a wheel, particularly a vehicle wheel, and for determining geometrical dimensions of the object, a service apparatus for a wheel, which is equipped with a sensing device, for determining geometrical dimensions of a wheel and a method for determining geometrical dimensions of a wheel, like a vehicle wheel, for determining geometrical dimensions of the wheel.

In practice, wheel service machines are known, like a mounting/demounting machine for mounting a tyre to a rim of a wheel or for demounting a tyre from a rim of a wheel, in particular a vehicle wheel, or a wheel balancer on which a wheel, or only the rim or the tyre of a tyre/rim combination, is inspected, e.g. for detecting unbalances in the wheel or deformations of the tyre or the rim, the rim profile or the characteristics of the tyre.

From EP patent application 2 360 461, an apparatus for determining geometrical dimensions of a wheel is known, which includes a measuring unit with a sensing device, like an ultrasonic sensing device, including an emitter/receiver transmitter for scanning the wheel, an angle measuring means including accelerometer means to measure a pivot angle. The measuring unit is mounted to a hood of a wheel balancer, and is pivoted together with the hood for executing a measurement operation.

In DE patent application 100 35 118, a scanning device is disclosed, which is part of a wheel balancer. The scanning device is used for scanning the rim profile of a wheel to be balanced, and for identifying the position in which a balancing weight is to be attached to the rim. A light source and a receiver are separately mounted on respective carrier plates which are pivoted by a stepper motor. The angular position of the light source and the receiver is detected by a rotary encoder.

In these known devices, the pivotal movement of the sensing device during the measuring operation is executed manually or by a stepper motor which has a fixed increment or pitch. Thus, the actual position of the sensing device and the resolution of the scan is restricted, dependent on the pitch or step size of the stepper motor. In order to increase e.g. the solution of a scan, namely the number of points on a predefined length or area, the stepper motor may be equipped with a reduction gear. Moreover, the known devices are of a complex construction and sensitive to impurities, which influences the accuracy of the measurement or positioning results. Additionally, the components of the sensing device have to be aligned to each other after assembling which is time consuming.

Thus, it is an object of the present invention to provide a sensing device, a wheel service apparatus and a method for determining geometrical dimensions of a wheel, which overcome the above mentioned drawbacks, and which enable a simplified construction and an efficient control of the measurement operation.

SUMMARY

According to the present invention, there is provided a wheel service machine, like a tyre changer or a wheel balancer, for servicing a wheel, like a vehicle wheel. The wheel service machine comprises a rotary mounting including a shaft to which the wheel is mounted, a frame work for carrying at least the rotary mounting and a sensing device mounted to the frame work, for determining geometrical dimensions of the wheel, or parts of the wheel like the tyre and/or the rim or sections thereof. The sensing device comprises a carrier element and a first sensing unit for sensing our scanning the wheel and computing means for determining the geometrical dimensions of the wheel based on the data received from the sensing device, the first sensing unit being mounted on the carrier element. In the inventive sensing device, the wheel service machine further comprises a drive means for enabling a pivotal movement of the sensing device, wherein the drive means is a micro stepper motor.

By providing a drive means for the sensing device, which is realized by a micro stepper motor, a high resolution of a scan may be reached without the need of a reduction gear. This enables an increase in the accuracy of the scan, due to the fact that no additional mechanical transmission elements are arranged between the motor and the sensing device, whereby additional vibrations are omitted. Moreover, the construction of the wheel service machine becomes more simply and smaller, since no counter-weights or springs have to be provided for balancing the additional weight of a reduction gear. Also, a smaller motor may be used since no frictional forces of an additional reduction gear have to be overcome.

In a preferred embodiment, the first sensing unit is an optical sensing unit which includes an emitter, preferably a laser, and a receiver, preferably a CCD or CMOS component or sensor. Since the elements of the first sensing unit are arranged on the common carrier element, they are in a fixed relation to each other. Accordingly, for the measurement operation, only the emitter has to be aimed on the target surface of the wheel to be sensed or scanned, respectively. A movement or readjustment of the receiver is not necessary due to the fixed arrangement on the carrier element.

In a further preferred embodiment, the sensing device further comprises a second sensing unit for sensing the angular position of the sensing device. The second sensing unit may include any suitable sensing elements which allow the detection of the angular position of the sensing device, like encoders. It is further preferred that the second sensing unit comprises at least one accelerometer sensor. Such a sensor may provide very accurate results regarding the pivot angle of the sensing device. Accelerometer sensors, additionally, may sense pivot angles not only in one plane, but also in more than one plane, like in two planes arranged in a defined angle to each other, for determining the exact position of the sensing device.

Furthermore, on the basis of the angle measurement results of the at least one accelerometer sensor, a feedback control may be executed by the control unit, e.g. in order to correct the position of the sensing device or to reposition the sensing device in a desired angle, e.g. for verifying an earlier measurement result.

In order to enable a compact design of the sensing device, in an advantageous configuration, at least the first sensing unit and the second sensing unit are commonly mounted on the carrier element. It has to be understood that also the computing means may be mounted on the carrier element.

The drive means for enabling a pivot movement of the sensing device, at least during the measuring procedure, are coupled to the frame work of the wheel service machine via an attachment element, like an approximately L-shaped element. Due to the compact design of the sensing device, said attachment element may have small dimensions, and the sensing device may be positioned closed to the frame work. The sensing device thereby does not protrude excessively from the frame work, whereby possible damages of the sensor device may be prevented.

In one embodiment, the drive means is mounted to the frame work of the wheel service machine. That means, the drive means is fixedly arranged at the frame work of the wheel service machine by the attachment element, and the sensing device is coupled to the axle of the drive means for being pivoted. This design allows the sensing device to be removable coupled to the drive means, e.g. for an adjustment of the sensing device to the wheel just to be scammed.

In an alternative embodiment, the drive means is mounted to the carrier element of the sensing device. Here, the axle of the drive means is fixedly connected with the attachment element which is mounted to the frame work of the wheel service machine. In this case, during the pivot movement of the sensing device, the drive means pivots together with the sensing device about its axle. In this constitution, also the drive means is part of the sensing device, whereby the compactness of the sensing device is further increased. Furthermore, the electronic control means for the drive means may also be incorporated into the sensing device.

In a preferred embodiment, the carrier element provides an assembling aid structure such that the components of the sensing device, i.e. e.g. the emitter and the receiver, have a defined positional relationship to each other. Thus, any alignment or adjustment or calibration of the components to each other is not necessary during mounting of the sensing device to a machine.

The assembling aid structure may be realized in various ways, in a further preferred embodiment, the carrier element provides an assembling aid structure for having a defined positional relationship of the components of the sensing device to each other. The positional relationship may be adjusted by respective positioning means, like grooves or notches, which accommodate at least the receiver and/our the emitter. The assembling aid structure may include more than one positioning means, for allowing the emitter and/our the receiver to be positioned in different positions relative to each other, in adaption to different kinds of wheels to be scanned, or different kinds of areas of a wheel, e.g. in case of a very large wheel. It has to be understood that the assembling aid structure may also include only one structure or positioning means, for positioning the emitter and/or the receiver relative to each other.

The carrier element may be a housing for accommodating one or all of the first sensing unit, the second sensing unit, the computing means and the drive means, whereby these components are covered and protected, e.g. against damage or impurity.

Additionally, the compact design, and in particular the accommodation of all, or at least the main components of the sensing device in the housing, reduces the amount of electric leads or cables, respectively, necessary for connecting the components of the sensing device with other components of a machine in which the inventive sensing device is used. Moreover, the total length of the cables decreases so that measurement errors and the risk of damages are reduced.

For further reducing measurement errors during the transmission of data between the sensing device and the control unit for controlling at least the pivot movement of the sensing device, the sensing device may further include means for wireless transmission of data to the control unit of the wheel service machine. Naturally, the data generated by the sensing device, may also be transmitted via a respective wire which connects the sensing device to the control unit.

Further according to the present invention, there is provided a method for servicing a wheel, like a vehicle wheel, on a wheel service machine, like a tyre changer or a wheel balancer, which includes a frame work, a rotary mounting having a rotatable shaft, a sensing device and a control unit. The method comprises the steps of mounting a wheel on the shaft of the rotary mounting of the wheel service machine, rotating the wheel about the shaft, sensing or scanning the wheel surface, or parts thereof like the tyre/our the wheel and/our sections thereof, by the sensing device, pivoting the sensing device which is coupled to the frame work, during the measuring operation relative to the frame work by drive means, wherein the drive means is a micro stepper motor, and determining the geometrical dimensions of the wheel by means of computing means.

The inventive method for determining geometrical dimensions of a wheel thereby provides the same advantages as explained in conjunction with the inventive sensing device and the apparatus for determining geometrical dimensions of a wheel.

Preferably, the determination of the geometrical dimensions of the wheel can be carried out by triangulation.

According to the inventive method, the pivotal movement of the sensing device is controlled by the control unit.

In a preferred embodiment of the method for determining geometrical dimensions of a wheel, the sensing device used can include an optical sensing unit for determining at least the distance between the sensing device and the sensed point on the wheel. Furthermore, the optical sensing unit can include a laser.

In a further embodiment of the method for determining geometrical dimensions of a wheel, the sensing device used can include angular measuring means for determining the angular position of the sensing device) at least relative to the frame work. Moreover, the angular measuring means can include accelerometer sensors.

Further advantages and embodiments of the present invention will be described in the following together with the drawings listed below. The expression "left", "right", "below" and "above" used in the following description, are referred to the drawings in an alignment such that the reference numbers and the notation of the figures used, can be read in normal.

DETAILED DESCRIPTION

Figure 1:
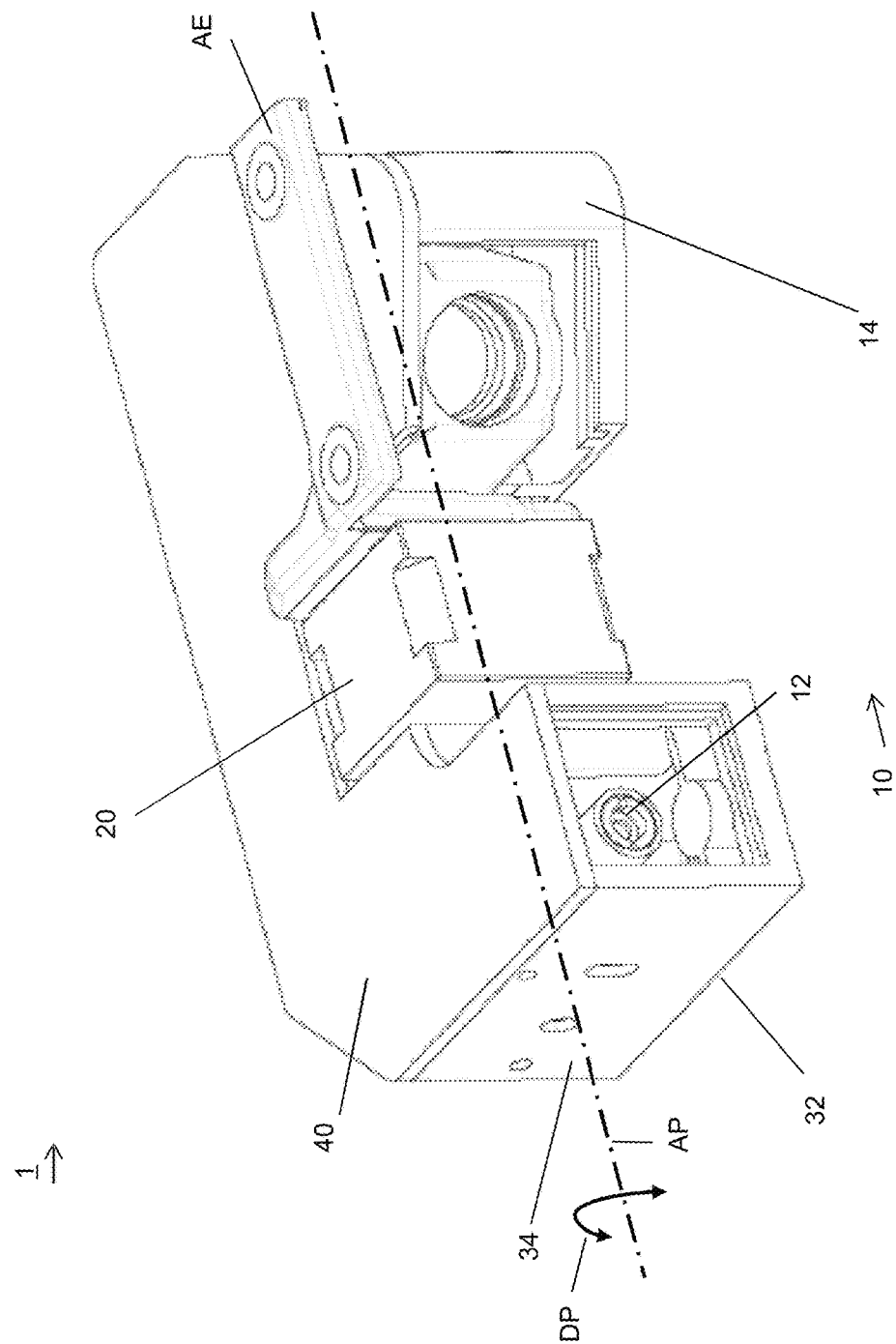
FIG. 1 is a schematic and perspective view of a sensing device according to the present invention.

FIG. 1 is a schematic and perspective view of a sensing device 1 according to one embodiment the present invention. Sensing device 1 includes as its main components a first sensing unit 10 which is preferably an optical sensing unit and a second sensing unit (not shown) which includes a position sensitive element. Sensing device 1 further comprises a housing 30 and a coverage 40 arranged at the upper end of housing 30.

In FIG. 1, also a drive means 20 is shown, which may be coupled to the frame work of a wheel service machine 50 (see FIG. 2) via an attachment element AE. Drive means 20 which is a micro stepper motor, comprises a motor shaft to which sensing device 1 is coupled for executing a pivot movement. The motor shaft of drive means or motor 20 provides a pivot axis AP about which sensing device 1 is pivoted in pivot direction DP.

In this example, drive means 20 is a standard stepper motor imparted with micro stepping capabilities by the use of ad hoc control electronics, such as, for instance, the dSPINTM fully integrated microstepping motor driver provided by STMicroelectronics. However, in different examples, the micro stepping capabilities of drive means 20 can also be provided in a different way.

Figure 2:
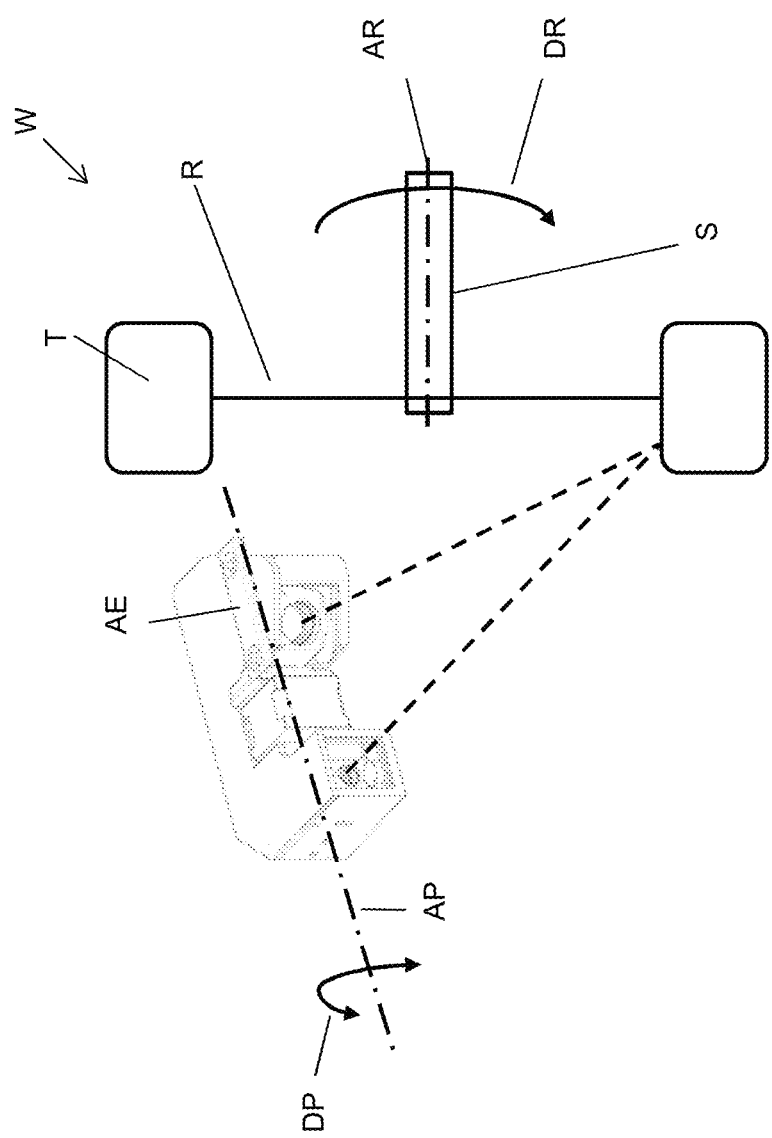
FIG. 2 is a schematic and perspective view of a wheel service machine which includes a sensing device according to the present invention.

FIG. 2 is a schematic and perspective view of a wheel service machine 50 which includes a sensing device 1 according to the present invention.

Wheel service machine 50 includes an approximately horizontally arranged shaft S on which a wheel W, like a vehicle wheel, is mounted. Shaft S has a longitudinal axis AR about which shaft S can be rotated, e.g. during the measurement step of the service operation, like a balancing operation or a tyre mounting or demounting operation. Wheel W includes a rim B and a tyre T. It has to be noted that shaft S may also have any other suitable orientation, e.g. shaft S may be arranged vertically.

Service machine 50 further includes a frame work (not shown) which carries the basic components of service machine 50, like shaft S, the drive for driving shaft S, a control unit or security devices, like protective coverage.

Sensing device 1 is pivotally mounted to the frame work of service machine 50 by attachment element AE which is fixedly coupled to motor 20. The pivoting shaft or motor shaft, is arranged approximately horizontally to base portion 32 of housing 30. Accordingly, pivot axis AP is also arranged at least approximately horizontally to base portion 32 of housing 30. Thus, sensing device 1 may reversibly be pivoted in pivot direction DP about pivot axis AP in a plane vertically to base portion 32 of housing 30.

A light beam EB emitted by emitter 12 of first sensing unit 10, impinges rim R or tyre T of wheel W and is reflected therefrom. The reflected light beam RB is received by receiver 14 of first sensing unit 10.

A second sensing unit which, in this embodiment of a sensing device, is also accommodated in housing 30 of sensing device 1, includes a position sensitive element for detecting the position of sensing device 1 during the pivot movement. The beginning and the end of a measuring operation are predetermined conventionally by the control unit and the start as well as the end position of a sensing device for executing the pivot movement, are accomplished by mechanical stoppers. It is also possible to determine the start and end position of sensing device 1 by the second sensing unit, or to provide predefine start and end positions, which are detected by the second sensing unit for starting or stopping the movement of sensing device 1.

The second sensing unit may include any suitable position sensitive elements (not shown). These position sensitive elements or sensors are also coupled fixedly to housing 30 of sensing device 1. In a preferred embodiment, the second sensing unit includes at least one, preferably two accelerometer sensors, which may detect the movement of sensing unit 1 in one or two planes. In case that two sensors are provided, the detection planes may be arranged in any suitable angle to each other. The sensing planes may be arranged parallel or vertical to each other. It is also possible to use any other suitable angle measuring sensors, like inclinometers or encoders, for detecting the angular position of sensing device 1.

In this example, the at least one accelerometer sensor is a MEMS (micro electromechanical systems) accelerometer. However, in different exam-ples, also other accelerometer sensors known in the art are contemplated.

Figure 3:
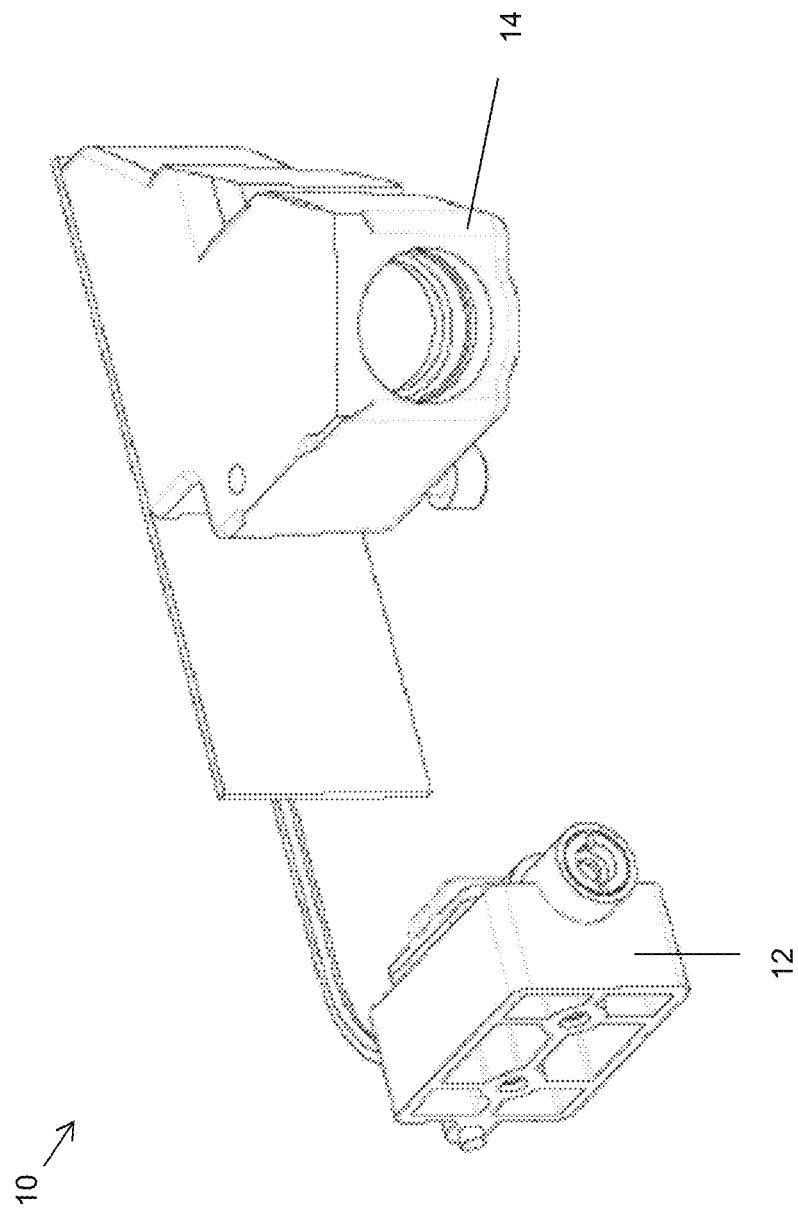
FIG. 3 is a schematic and perspective view of the first sensing unit of the sensing device according to FIG. 1.

As it can be seen in FIG. 3, first sensing unit 10 which is preferably an optical sensing unit, includes an emitter 12 and a receiver 14. Emitter 12 which is preferably a laser, and receiver 14 which is preferably a CCD or CMOS component, are fixedly coupled to housing 30, and arranged in fixed relation relative to each other defining an acute angle between their optical axis, preferably equal to or less than 45°.

As further shown in FIG. 1, drive means 20 which, in the embodiment of FIG. 1, is a micro stepper motor. In an alternative embodiment, drive means or motor 20 may also be accommodated in housing 30 and fixedly coupled thereto. In this embodiment, drive means 20 may further include a gear (not shown) which is aligned to pivot axis AP about which sensing device 1 may be reversibly pivoted in a pivot direction DP. In this embodiment, pivot axis AP is also oriented horizontally. However, the inventive sensing device can be arranged in any other orientation, i.e. with a pivot axis AP being vertically oriented or somewhere between a horizontal and vertical orientation.

Figure 4:
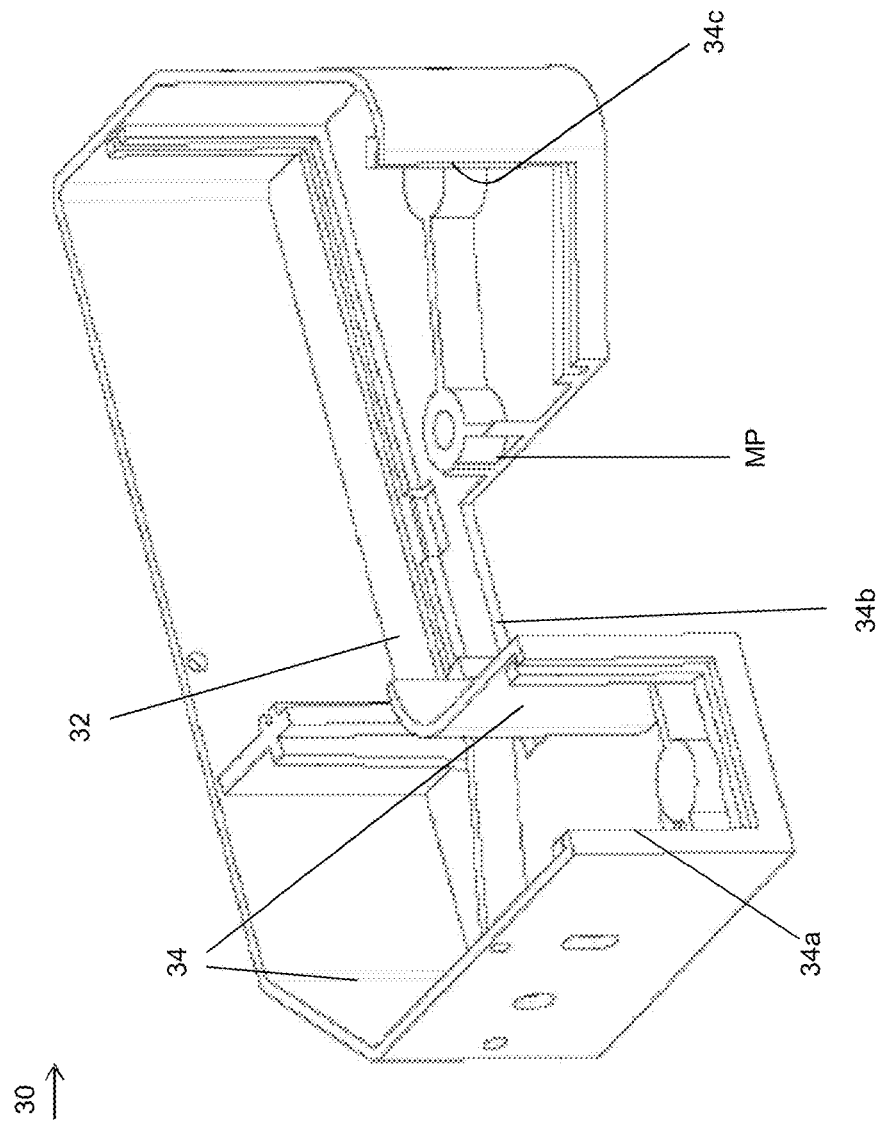
FIG. 4 is a schematic and perspective view of the carrier element of the sensing device according to FIG. 2.

FIG. 4 shows housing 30, which functions as a carrier element for the main components of sensing device 1, i.e. first sensing unit 10, the second sensing unit and drive means 20, and has a flat base portion 32 and a side wall 34 arranged at the circumferential edge of base portion 32 and extending upwardly there from. Side walls 34 surround at least substantially base portion 32 and are only discontinued to provide openings 34a, 34b, 34c for emitter 12 and receiver 14 of the first sensing unit 10 as well as drive means 20. Emitter 12 can emit light beams via opening 34a whereas receiver 14 can receive the light beam reflected from the tyre and/or rim of wheel W via opening 34c.

Moreover, base portion 32 is provided with alignment and assembly aid elements like, for example, ribs, projections and indentions for providing well defined locations for the mounting of the components of first sensing unit 10 and/or the second sensing unit and/or drive means 20. These alignment and assembly aid elements can also be provided for accommodating one or several circuit boards for controlling the first sensing unit 10 and/or drive means 20. Additionally, said alignment and assembly aid elements may also provided for accommodating protective elements for protecting the components of sensing device 1, like protective glasses covering emitter 12 and receiver 14. Furthermore, the components for a wireless data transmission can be accommodated in housing 30, for ex-ample via alignment and assembly aid elements.

Coverage 40 which is formed by a flat material and has an outer contour at least approximately congruent with base portion 32 of housing 30. Coverage 40 is arranged at the upper edge of side walls 34, and covers the space in housing 30.

Housing 30 and coverage 40 are made from any suitable material, preferably plastics or metal. In one embodiment, housing 30 may be made from metal for providing a strong base for the components of sensor device 1, and coverage 40 is made from plastics for enabling a wireless data transmission.

When mounting sensing device 1 to a machine, the design of the inventive sensing device allows that only emitter 12 has to be adjusted. Due to the defined relationship between emitter 12 and receiver 14 by base portion 32, no further adjustment is necessary. However, it is also possible that both emitter 12 and receiver 14 can be adjusted, e.g. while assembling sensor device 1.

Figure 5:
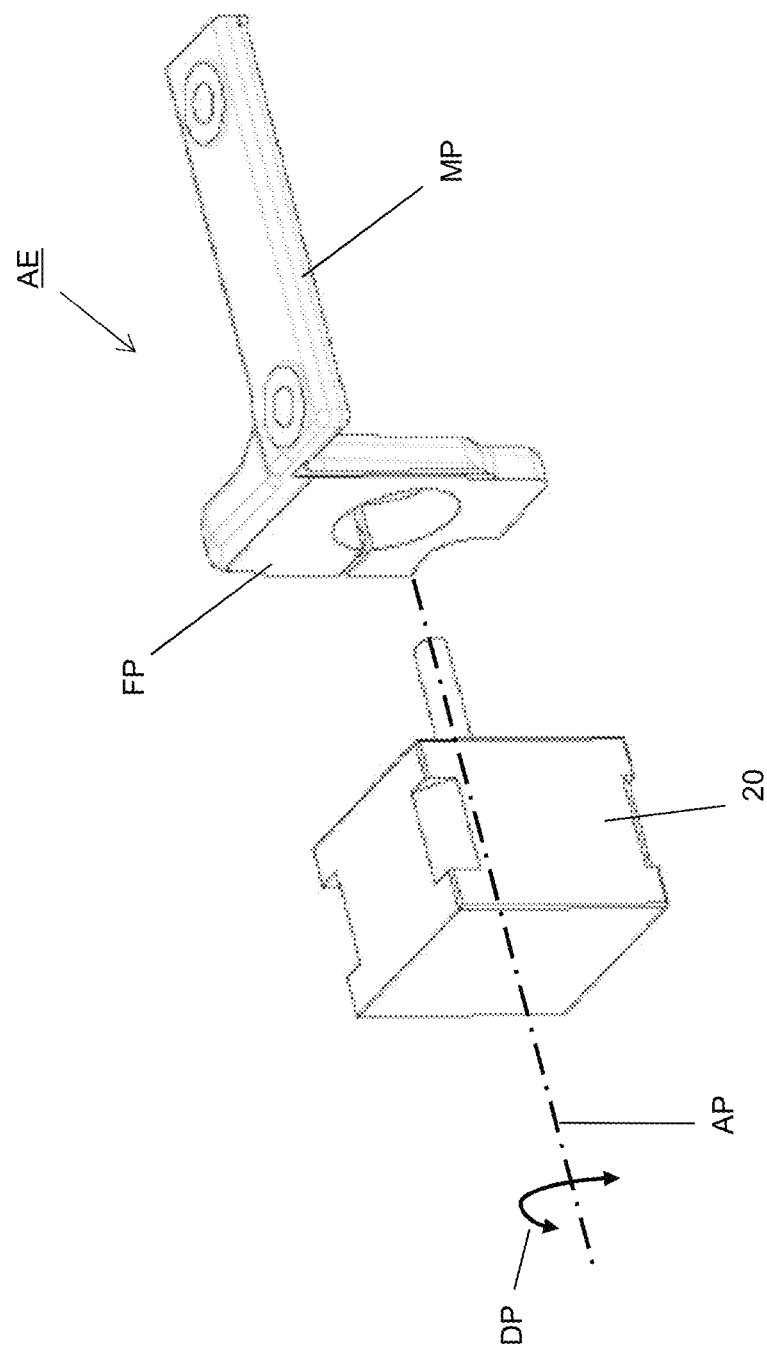
FIG. 5 is a schematic and perspective view of the drive means and the attachment element according to the present invention.

FIG. 5 is a schematic and perspective view of drive means 20 and attachment element AE according to the present invention.

As can be seen in FIG. 5, attachment element AE has a mounting portion MP, by means of which it is mounted to the frame work of wheel service machine 50, and a flange portion FP, by means of which attachment element AE is coupled to drive means or motor 20. Flange portion FP has a central opening through which the motor shaft of motor 20 extends, when attachment element AE is coupled to motor 20. Mounting portion MP of attachment element AE, in the embodiment of FIG. 5, comprises two whole for mounting attachment element AE to the frame work of wheel service machine 50. It has to be understood that attachment element AE may have any other suitable design than that shown in FIG. 5.

As further shown in FIG. 5, pivot axis AP about which sensing device 1 is pivoted during a measurement procedure, extends coaxially and centrally through the motor shaft of drive means 20.

For executing a service operation, a wheel W to be serviced is mounted on shaft S of service machine 50. Sensing device 1, and particular first sensing unit 10, is directed to wheel W for scanning the surface of tyre T and/or rim R, e.g. for detecting the geometry of tyre T or rim R. In case that service machine 50 is a wheel balancer, sensing device 1 may be used for mark the position of a balancer weight to be attached to rim R for level-ling an unbalance of wheel W.

Sensing device 1 is pivoted about axis AP by drive means 20 for scanning tyre T and/or rim R of wheel W. Wheel W is further rotated about axis AR of shaft S in rotation direction DR. Thereby, an image of the whole tyre T and/or rim R may be created, or of predefined regions thereof, like the tyre profile.

On the basis of the scanning results, e.g. in the case that service machine 50 is a tyre changer, the tyre conditions may be determined, e.g. the conditions of the profile or the side walls. Moreover, it may be deter-mined whether or not the tyre has to be changed. Additionally, the kind or size of the tyre may be determined for selecting a respective new tyre to be mounted. Furthermore, also deformations of rim R may be detected and it may be determined whether or not rim R has to be changed.

On the other hand, in case that wheel service machine 50 is a wheel balancer, the geometry of the rim may be determined so that the position of the weight may be marked to allow an operator to place the weight in the correct angular position.

Sensing device 1 includes an evaluation unit for determining the distance and the angular position of the surface portion of tyre T or rim R just scanned. The respective data are transmitted to the control unit of service machine 50, e.g. for controlling the rotation of wheel W about axis AR of shaft S, for rotating wheel W in a predetermined position, in which a balancer weight has to be placed or in which a deformation has been detected. Based on the data of the accelerometer sensors, also the pivot position of sensing device 1 may be controlled by the control unit of service machine 50.

The second sensing unit by means of which the angular position of sensing device 1 is detected, may be used for a feedback control for correctly positioning wheel W and sensing device 1, or for a re-measurement of selected portions of tyre T or rim R.

The data evaluated by sensing device 1 are transferred to the control unit of service machine 50. Sensing device 1 may be connected with the control unit of service machine 50 by a respective data wire. In order to reduce potential risks of damages by reducing the amount of wires or cables, sensing device 1 includes a wireless data transmitter which may be linked to a respective data receiver of the control unit. The wireless data transmitter of sensing device 1 includes a respective interface, which preferably is a standardised interface, like an IR- or Bluetooth-interface. Thus, only one cable for the power supply of the first sensing unit 10, drive means 20 and the second sensing unit is necessary. In case that no cable shall be present, it is also possible to integrate one or more batteries in housing 30.

Sensing device 1 is designed as a compact device which includes all components necessary for scanning a vehicle wheel and for processing the scanned data. Thus, sensing device 1 may be used as a portable sensing device, which may be temporarily or permanently coupled to the frame work of a wheel service machine. Sensing device 1 may also be used as an upgrade device for existing wheel service machines.

The invention claimed is:

1. A wheel service machine, like such as a tyre changer or a wheel balancer, for servicing a wheel (W), like a vehicle wheel, comprising:
   a rotary mounting including a shaft (S) to which the wheel (W) is mounted,
   a frame work for carrying at least the rotary mounting, and
   a sensing device mounted to the frame work, for determining geometrical dimensions of the wheel (W), or parts of the wheel (W), the sensing device comprises a carrier element and a first sensing unit for sensing the wheel (W) and computing device for determining the geometrical dimensions of the wheel (W) based on the data received from the sensing device, the first sensing unit (10) being mounted on the carrier element;
   the wheel service machine further comprises a drive element for enabling a pivotal movement of the sensing device, wherein the drive element is a micro stepper motor.

2. The wheel service machine according to claim 1, wherein the first sensing unit is an optical sensing unit which includes an emitter, preferably a laser emitter, and a receiver, preferably a CCD or CMOS component.

3. The wheel service machine according to claim 1, wherein the sensing device further comprises a second sensing unit that senses the angular position of the sensing device.

4. The wheel service machine according to claim 3, wherein at least the first sensing unit and the second sensing unit are commonly mounted on the carrier element.

5. The wheel service machine according to claim 1, wherein the drive element is mounted to the frame work of the wheel service machine.

6. The wheel service machine according to claim 1, wherein the drive element is mounted to the carrier element of the sensing device.

7. The wheel service machine according to claim 1, wherein the carrier element provides an assembling aid structure for having a defined positional relationship of the components of the sensing device to each other.

8. A method for servicing a wheel (W), such as a vehicle wheel, on a wheel service machine (50), like a tyre changer or a wheel balancer, which includes a frame work, a rotary mounting having a rotatable shaft (S), a sensing device and a control unit, the method comprises the steps of:
- mounting a wheel (W) on the shaft (S) of the rotary mounting of the wheel service machine;
- rotating the wheel (W) about the shaft (S);
- scanning the wheel surface, or parts thereof, by the sensing device;
- pivoting the sensing device which is coupled to the frame work, during the measuring operation relative to the frame work by a drive element, wherein the drive element is a micro stepper motor; and
- determining the geometrical dimensions of the wheel (W) by a computing device.

9. The method according to claim 8, wherein the determination of the geometrical dimensions of the wheel (W) is carried out by triangulation.

10. The method according to claim 8, wherein the pivotal movement of the sensing device is controlled by the control unit.

11. The method according to claim 8, wherein the sensing device includes an optical sensing unit that determines at least the distance between the sensing device and the sensed point on the wheel (W).

12. The method according to claim 11, wherein the optical sensing unit includes a laser.

13. The method according to claim 8, wherein the sensing device includes an angular measuring device that determines the angular position of the sensing device at least relative to the frame work.

14. The method according to claim 13, wherein the angular measuring device include accelerometer sensors.

15. The method according to claim 8, wherein the drive element is incorporated in the sensing device.

* * * * *